Aug. 3, 1954     D. G. HAEFELE     2,685,225

PHOTOGRAPHIC FILM GATE

Filed March 26, 1953

DONALD G. HAEFELE
INVENTOR.

BY Daniel I. Mayne

Karl T. Haramy

ATTORNEYS

Patented Aug. 3, 1954

2,685,225

UNITED STATES PATENT OFFICE 2,685,225

PHOTOGRAPHIC FILM GATE

Donald G. Haefele, Rochester, N. Y., assignor to Eastman Kodak Company, Rochester, N. Y., a corporation of New Jersey Application March 26, 1953, Serial No. 344,796

5 Claims. (Cl. 88—17)

The present invention relates to a photographic film gate for motion-picture apparatus, and more particularly to film gates especially adapted for handling films having more than one exposure laterally of the film, i. e., double eight exposure of 16 mm. film.

In the motion-picture art, the experts have been striving for years to design a film gate for cameras and projectors which will hold the film flat in a given plane and at the same time present only slight frictional resistance to the film movement. The gate must also accurately locate the film edgewise relative to the gate aperture, and this is particularly critical in 8 mm. apparatus in which the 8 mm. exposure frames are made side-by-side on a 16 mm. film strip by subsequently running the film through the camera twice and reversing it side-by-side between the two runs.

The primary object of the present invention is the provision of a photographic film gate which presents only slight frictional resistance to film movement while accurately holding it in a flat plane behind the aperture of the gate and while accurately guiding it edgewise relative to the gate aperture.

Another object is to provide a film gate which is adapted for handling films which are wider than the exposure frames to be made thereon whereby only a portion of the width of the film need be held in a flat plane in the gate at any one time, i. e., for example, gates for making 8 mm. exposures on 16 mm. film.

And a further object is to provide a film gate of the type described in which there is no direct pressure on the opposite faces of any portion of the film strip to frictionally resist movement of the film.

Another object is to provide a gate which is slightly more narrow than the film is wide and having one longitudinal guiding edge tapered so as to both force the film edgewise of the gate against a stationary edge guide wall disposed perpendicular to the film plane and accurately located relative to the gate aperture and to deflect the side of the film not alined with the gate aperture in a direction away from the focal plane. The film is located in the focal plane by raised guide rails on the two gate members which engage opposite faces of the film. These guide rails are transversely spaced relative to one another so that no portion of the film is subjected to direct pressure from both sides.

The above and other objects of the invention are embodied in a film gate comprising an aperture plate and a presser plate arranged in, and adapted to be spring-pressed into, flatwise relation to guide the film in its longitudinal movement and to maintain a portion of the width of the film flat in a focal plane of an optical system of which the gate forms a part. One side of the aperture plate is provided with a perpendicular shoulder for edge-guiding the film relative to the aperture and the opposite edge of one of the plates is provided with a tapered guiding wall which, because the gate is narrower than the film, serves both to force the film edgewise of the gate and into engagement with said shoulder and to deflect the side of the film remote from the aperture away from the focal plane. Cooperating raised guide rails are provided on each of the plates to engage opposite surfaces of the film to position the same in the focal plane behind the aperture, and the guide rails are transversely spaced relative to one another so that no portion of film is subjected to direct pressure from both sides.

The novel features that I consider characteristic of my invention are set forth with particularity in the appended claims. The invention itself, however, both as to its organization and its method of operation, together with additional objects and advantages thereof, will best be understood from the following description when read in connection with the accompanying drawing in which:

While the film gate is illustrated herein with respect to a motion-picture camera of the double-eight type in which the invention is particularly effective, it must be understood that the invention is also applicable to an 8 mm. projector in which the film is adapted to be handled in the 16 mm. width rather than split and joined end for end, or in any camera or projector in which the exposed frame occupies only a part of the entire width of a film strip, i. e., two 16 mm.

frames placed side-by-side on a 35 mm. film.

Figure 1:
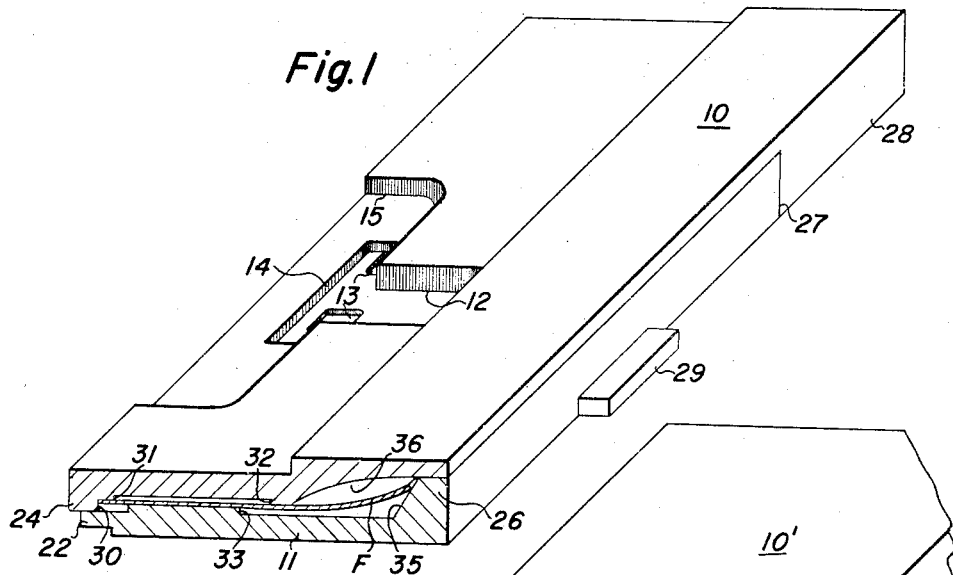
Fig. 1 is an enlarged sectional perspective view of a film gate for use in an 8 mm. camera and constructed in accordance with a preferred embodiment of the present invention, and showing a film strip in the position it assumes when properly moving through said gate.
Figure 4:
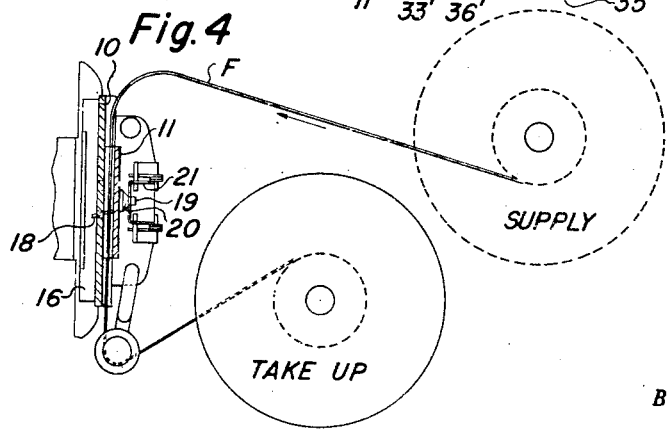
Fig. 4 is a side elevational view, partly in section, showing how the film gate is mounted in a camera and how the film strip moves therethrough.
Figure 3:
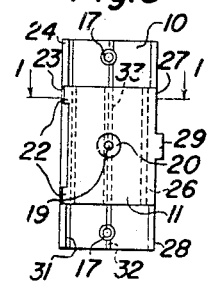
Fig. 3 is a full-size rear elevational view of the film gate shown in Fig. 1.

Referring now to the drawing, and particularly Figs. 1, 3 and 4, the 8 mm. camera film gate comprises, as is well known in the art, an aperture plate 10 wide enough to receive a 16 mm. film F arranged in flatwise relation with a pressure plate or pad 11 to form a passageway for guiding the film in its longitudinal movement. The aperture plate 10 is provided with an 8 mm. aperture 12 extending from the middle of the 16 mm. film to a point just short of the row of film perforations 13 at one side of the film. If the film is to be intermittently advanced by the usual claw mechanism, then the aperture plate has an elongated slot 14 alined with the row of perforations and through which the claw of the camera pull-down mechanism extends to grip the film perforations. The face of the plate adjacent the slot 14 may be milled away, as shown at 15, to provide the necessary clearance for the pull-down mechanism driving the claw. As is conventional procedure, and as shown in Fig. 4, the aperture plate 10 is usually fixed in the front wall 16 of the camera by a pair of screws or rivets 17, see Fig. 3, with the aperture 12 axially alined, and at the focal plane of, a camera lens, not shown, mounted on the front wall of the camera. The film claw, indicated at 18 in Fig. 4, can then extend through elongated slot 14 to intermittently engage the film perforations. The presser plate or pad 11 is generally spring-pressed into engagement with the aperture plate, and a well-known construction to this end is shown in Fig. 4. The rear of the presser pad 11 has extending therefrom a stud 19 having a conical portion 20 against which a U-shaped spring 21 on the mechanism plate of the camera acts. The presser pad includes two ears 22 extending from one side which serve both as hinge pintles for allowing the presser pad to be manually moved to an open position relative to the aperture plate for threading purposes and as locating surfaces for locating the presser pad relative to the aperture plate. As indicated in Figs. 1 and 3, the ears 22 on the presser pad 11 lie in notches 23 formed in a flange 24 extending longitudinally along one side of the aperture plate. When the presser pad is slipped into position, these two ears lie behind a pair of upstanding lugs on the mechanism plate of the camera, not shown, to permit hinging of the presser pad to an open position so that the film can be threaded into the gate edgewise, all as is well known in the art. The relative positions of the presser plate and aperture plate are further defined by cooperation between a flange 26 on the presser plate 11 at the side of the plate opposite ears 22 which extends into a notch 27 in the edge 28 in the aperture plate 10, see Figs. 1 and 3. A fingerpiece 29 extending from flange 26 permits the operator to swing the presser plate between its closed and operative position relative to aperture plate 10, see Figs. 1 and 4, and an open or threading position against the action of spring 21. The sectional view shown in Fig. 1 is taken substantially on line 1—1 of Fig. 3.

The aperture plate 10 is provided at its left side, looking at Fig. 1, with a vertical edge-guiding shoulder 30 extending longitudinally of the gate which is perpendicular to the focal plane in which the film is to be positioned and which properly edge guides the film relative to the aperture 12. The aperture plate is also provided with two raised guide rails 31 and 32 extending longitudinally of the gate and the tops of which are parallel to the focal plane and are adapted to engage one surface of the film to establish the film plane for that half of the film being exposed. The presser plate 11 is also provided with a guide rail 33 which engages the other side of the film F so as to cooperate with guide rails 31 and 32 on the aperture plate to hold the film flat in the focal plane. As explained before, the pressure plate 11 is forced flatwise against the aperture plate 10 by a spring 21 in the camera so that the engagement between ears 22 on the presser plate with the bottoms of notches 23 in the aperture plate, along with the engagement between the flange 26 on the presser plate with the bottom of notch 27 in the aperture plate, determine the relative spacing of the two gate members. These surfaces should be so machined that there is a clearance of at least .010" between each of the guide rails 31, 32 and 33 and the portion of the opposed gate member which they are each opposite. Accordingly, since the guide rails are separated from each other transversely of the gate and this clearance is provided between them and the opposing portions of the gate members, it will be observed that there is at no portion of the film a direct pressure on opposite sides thereof which can serve to pinch the film and provide an undesirable frictional resistance to its longitudinal movement.

The inner wall 35 of flange 26 of presser pad 11 is tapered inwardly toward the focal plane and the dimension between vertical edge-guiding shoulder 30 on the aperture plate and the wall 35 is slightly less than the width of the 16 mm. film. As a result of this, when the gate is closed, the edge of the film engaging tapered wall 35 is deflected or bent back out of the focal plane and the aperture plate 10 is milled away to provide a recess 36 into which this deflected portion of the film may extend.

It can thus be seen that the tapered wall 35 of the aperture plate serves both to force the film edgewise of the gate into proper engagement with the edge-guiding shoulder 30 and hold it there, thus eliminating any further need for side guiding, and to deflect the film in the manner shown whereby a reacting force is placed on the other side of the film which results in it being properly forced into surface engagement with the guide rails. Since there is no direct pressure on both surfaces of any portion of the film, frictional resistance to longitudinal film movement is entirely a result of the longitudinal bend in the film strip which results in a very smooth and uniform film pull not dependent upon the pressure of the spring acting against the presser pad.

Figure 2:
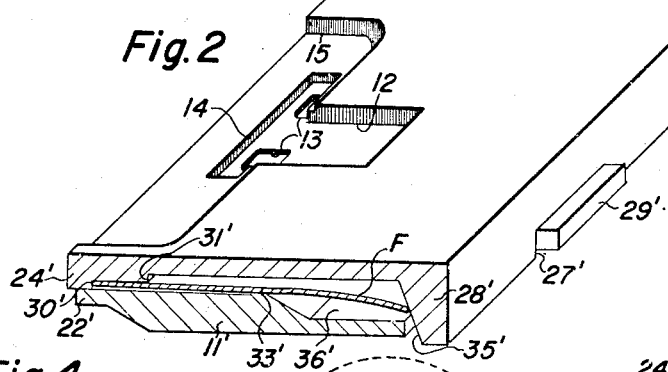
Fig. 2 is a view similar to Fig. 1 showing a slightly modified form of the film gate.

In Fig. 2, I have shown another modification of the present invention. Since this embodiment is essentially the same as that already described, differing therefrom primarily in the different location of the film-guiding elements, corresponding parts in this embodiment will be referred to by the same reference characters as used for the same parts in the first instance with a prime (') suffix. In this embodiment, the gate comprises an aperture plate 10' and a presser plate or pad 11' which are adapted to be relatively mounted and spring-pressed together in exactly the same manner as above described. As before, the presser plate 11' has two ears 22' which engage notches in a flange 24', but in this instance the fingerpiece 29' supplants the flange 26 and enters a small notch 27' in the flange 28' of the aperture plate to help position the two parts relative to one another. In this instance, it is the surface of fingerpiece 29' which is accurately machined along with the ears 22' and the bottom of the notches engaged by these ears and the bottom of notch 27' in order to provide the desired clearance between the guide rails and the opposing surfaces of the gate members so that there is no direct pressure on both sides of any portion of the film. In this embodiment, only one guide rail 31' is provided on the aperture plate immediately adjacent the edge-guiding shoulder 30' on flange 24'. It is the flange 28' on the aperture plate 19' which has a tapered wall 35' for deflecting the edge of the film into a recess 36' formed in the side of the presser plate removed from the focal plane. The presser plate has only a single guide rail 33' as before, but here it is located at the inner edge of the focal plane. In this instance, the force applied to the edge of the film by the tapered wall 35' and causing the longitudinal bend in the film results in the film acting as a lever about the outside corner of rail 33' as a fulcrum whereby the surface of the film at the other edge is forced up against rail 31' to be accurately located in the focal plane thereby. Since the top of rail 33' has some width and lies in a plane parallel to the focal plane and spaced from the plane of the top of rail 31' by a distance equal to the film thickness, these two rails will accurately locate the film in the focal plane. While in Fig. 2 I have shown the spacing between the rails 31' and 33' and the opposing portions of the opposite gate members greater than in the Fig. 1 embodiment, it is pointed out that this discrepancy has been deemed necessary to more clearly illustrate the lever effect applied to the film by the tapered wall 35' in this case, and that in actual practice these clearances could be the same in both instances. It will be observed that this second embodiment of film gate has the same advantages over the prior art as the first-disclosed embodiment, and that the two operate on exactly the same principle.

Although I have shown and described certain specific embodiments of my invention, I am aware that many modifications thereof are possible. My invention, therefore, is not to be limited to the precise details and construction shown and described, but is intended to cover all modifications coming within the scope of the appended claims.

Having thus described my invention, what I claim as new and desire to secure by Letters Patent of the United States is:

1. A photographic gate for film comprising a pair of gate members arranged in flatwise relation to guide the film in its longitudinal movement and to maintain a portion of the width of the film in a focal plane therebetween, a vertical guide shoulder extending longitudinally along one edge of one of said gate members to edge-guide the film in a straight line, the opposite longitudinal edge of one of said gate members tapered inwardly toward said focal plane to engage and guide the opposite edge of the film and spaced transversely from said vertical shoulder so that at said focal plane the dimension between said shoulder and said tapered edge is less than the width of the film, whereby said tapered edge serves both to force the film edgewise of the gate into engagement with said shoulder and to deflect one edge of the film out of said focal plane, said gate member other than the one provided with said tapered edge provided with a recess into which the deflected edge of the film may extend, a longitudinal guide rail on one of said gate members adjacent said vertical shoulder for engaging one surface of the film adjacent one edge to locate the film in said focal plane, a second longitudinal guide rail on the other gate member to engage the opposite surface of said film to locate the film in said focal plane and spaced transversely of said gate with respect to said first guide rail, those portions of each of the gate members opposite the respective guide rails on said members being recessed so as to provide a film clearance greater than the thickness of the film whereby no one point on the film is subject to direct pressure from both sides.

2. A photographic gate for film comprising an aperture plate and a pressure plate arranged in flatwise relation to guide the film in its longitudinal movement and to maintain a portion of the width of the film in a focal plane therebetween in alinement with the aperture in said aperture plate, a vertical guide shoulder extending longitudinally along one edge of said aperture plate to edge-guide the film in a straight line past said aperture, the transversely opposite longitudinal edge of one of said plates tapered inwardly toward said focal plane to engage and guide the opposite edge of the film and spaced transversely from said shoulder so that at said focal plane the dimension between said shoulder and said tapered edge is less than the width of the film whereby said tapered edge serves to both force the film edgewise of the gate into engagement with said shoulder and to deflect the film edge it engages out of said focal plane, said plate other than the one having said tapered edge provided with a recess into which the deflected edge of the film may extend, cooperating locating surfaces on the aperture plate and pressure plate adapted to engage one another to positively position the two plates relative to one another, raised longitudinal guide rails on each of said plates adapted to engage opposite surfaces of the film to locate the film in said focal plane, said guide rails relatively spaced transversely of the gate so that no two are directly opposite one another or close enough to each other to apply direct pressure on any point of the film from both sides.

3. A gate for motion-picture apparatus adapted to longitudinally guide a film strip and locate only a portion of its entire width in a focal plane relative to the gate aperture and comprising an aperture plate which is at least as wide as the film strip and provided with an aperture adjacent one edge for uncovering only a portion of the width of the film, a presser plate arranged in flatwise relation with said aperture plate and adapted to be spring-pressed toward said aperture plate, cooperating locating surfaces on said two plates outside of the film path to positively locate their positions relative to one another, a stationary wall extending longitudinally along the edge of said aperture plate adjacent said aperture and perpendicular to the film path to edge-guide the film past said aperture, the other edge of one of said plates remote from said aperture tapered inwardly toward said stationary wall and spaced therefrom by a distance less than the width of the film whereby said tapered edge serves both to force the film edgewise of the gate into engagement with said wall and to deflect the film edge it engages out of said focal plane, the plate other than the one having said tapered edge provided with a recess into which the deflected portion of the film strip may extend, a raised longitudinal guide rail on the aperture plate perpendicular to said stationary wall and adapted to engage one surface of the film adjacent one edge to position the film in the focal plane, a second raised longitudinal guide rail on the presser plate for engaging the other surface of said film to locate the film in the focal plane, said two rails spaced relative to one another transversely of the gate, and the portions of each plate opposite each rail on the opposing plate being recessed to provide a film passage slightly greater than the thickness of the film, whereby no one point on the film is subject to direct pressure from both sides.

4. A gate for motion-picture film comprising an aperture plate and a presser pad adapted to be spring-pressed into flatwise relation to guide the film in its longitudinal movement and to maintain only a portion of the width of the film in a focal plane therebetween in alinement with the aperture in said aperture plate, cooperating locating surfaces on the plate and pad outside of the film path to positively locate their positions relative to one another, a stationary wall extending longitudinally along the edge of the aperture plate adjacent the aperture therein and perpendicular to said focal plane to edge-guide the film past said aperture, the transversely opposite edge of the pressure pad tapered inwardly toward said focal plane to engage and guide the opposite edge of the film and spaced transversely from said wall by a distance less than the width of the film whereby said tapered edge serves both to force the film edgewise of the gate into engagement with said wall and to deflect the film edge it engages out of said focal plane, the aperture plate adjacent said tapered edge provided with a recess into which the deflected edge of the film may extend, two raised guide rails extending longitudinally of said aperture plate on opposite sides of the aperture therein and adapted to engage one surface of the film to position it in said focal plane, and at least one raised guide rail extending longitudinally of the presser pad and adapted to engage the other surface of said film to position the film in the focal plane, said guide rail on said presser pad spaced intermediate the two on said aperture plate whereby all portions of the film are free from direct pressure from both sides.

5. A gate for motion-picture film comprising an aperture plate and a presser pad adapted to be spring-pressed into flatwise relation to guide the film in its longitudinal movement and to maintain only a portion of the width of the film in a focal plane therebetween in alinement with the aperture in said aperture plate, cooperating locating surfaces on the plate and pad outside of the film path to positively locate their positions relative to one another, a stationary wall extending longitudinally along the edge of the aperture plate adjacent the aperture therein and perpendicular to said focal plane to edge-guide the film past said aperture, the transversely opposite edge of the aperture plate tapered inwardly toward said focal plane to engage and guide the opposite edge of the film and spaced transversely from said wall by a distance less than the width of the film whereby said tapered edge serves both to force the film edgewise of the gate into engagement with said wall and to deflect the film edge it engages out of said focal plane, the presser pad adjacent said tapered edge provided with a recess into which the deflected edge of the film may extend, a raised guide rail extending longitudinally of said aperture plate adjacent said stationary wall, the top of said rail being perpendicular to said wall and adapted to engage one surface of the film to locate it in the focal plane, a second raised guide rail extending longitudinally of said presser pad at a point transversely spaced from said first guide rail and adjacent the other edge of said aperture, the top of this second guide rail adapted to engage the other surface of said film and spaced from the top of said first guide rail by a distance substantially equal to the thickness of the film, whereby the two rails cooperate to position the film in said focal plane without subjecting any portion of the film to direct pressure from both sides.

No references cited.